United States Patent

White

Patent Number: 5,226,995
Date of Patent: Jul. 13, 1993

[54] METHOD AND APPARATUS FOR JOINING PLASTIC OPTICAL FIBERS

[75] Inventor: Sebastian N. White, St. James, N.Y.

[73] Assignee: The Rockefeller University, New York, N.Y.

[21] Appl. No.: 707,157

[22] Filed: May 28, 1991

[51] Int. Cl.$^5$ .............................................. B29C 65/22
[52] U.S. Cl. .................................... 156/158; 156/159; 156/245; 156/285; 156/304.2; 156/304.5; 156/304.6; 156/382; 385/96
[58] Field of Search ............... 156/158, 159, 245, 258, 156/285, 286, 296, 304.2, 304.5, 304.6, 309.6, 382, 498, 502; 264/1.5, 102, 248; 385/96, 99, 143

[56] References Cited

U.S. PATENT DOCUMENTS

| | | | |
|---|---|---|---|
| 3,472,921 | 10/1969 | Fyfe | 385/143 |
| 3,514,308 | 5/1970 | Scott | 156/286 |
| 4,152,190 | 5/1979 | Kurosawa et al. | 156/502 |
| 4,157,931 | 6/1979 | Bricot et al. | 264/102 |
| 4,541,883 | 9/1985 | Lewis | 156/158 |
| 4,792,374 | 12/1988 | Rianda | 156/503 |
| 4,923,540 | 5/1990 | Born et al. | 156/158 |

FOREIGN PATENT DOCUMENTS

| | | | |
|---|---|---|---|
| 2062913 | 7/1971 | France | 156/158 |
| 670685 | 6/1989 | Switzerland | 156/304.5 |
| 859006 | 1/1961 | United Kingdom | 264/102 |
| 2074090 | 10/1981 | United Kingdom | 156/286 |

OTHER PUBLICATIONS

Adhesives Handbook, CRC Press, pp. 8-18, 1970.

Primary Examiner—Michael W. Ball
Assistant Examiner—Steven D. Maki
Attorney, Agent, or Firm—Wyatt, Gerber, Burke and Badie

[57] ABSTRACT

Apparatus and method for joining two ends of plastic optical fibers after the ends have been formed, preferably cut at a bias. The ends are pushed together within a tightly fitting quartz tube and their juncture is heated, by a resistance wire filament which surrounds the tube, to melt the ends and form a splice. The quartz tube is split into a top member and a bottom member and the spliced optical fiber is removed from the tube by opening the two tube members.

4 Claims, 3 Drawing Sheets

METHOD AND APPARATUS FOR JOINING PLASTIC OPTICAL FIBERS

BACKGROUND OF THE INVENTION

1. Field of the Invention

The present invention relates to methods and apparatus for joining the two ends of plastic optical fiber into a permanent splice having low transmission loss across the splice.

2. Related Art

Optical fibers are used to transmit information. If properly made, optical fibers permit the transmission of a wide band of frequencies with relatively little loss. Examples of use of optical fibers include intercity transmission of analog telephone and television information, digital data networks and high fidelity systems.

An optical fiber generally consists of a solid core, which may be transparent glass or plastic of a higher refractive index, and a cladding surrounding the core, the cladding, being a transparent material of a lower refractive index. The optical fiber is covered with a protective sheath which, in the case of plastic optical fiber, may be relatively thick compared to the optical fiber. The core generally is 0.5 to 2 mm i.d. (inner diameter) i.e., as thin as a human hair.

The joining (splicing) of the ends of glass or plastic optical fibers may be accomplished either by forming a permanent bond, for example, using a cemented joint or heat-welded joint, or by forming a connected bond using a mechanical connector. Such mechanical connectors are shown in U.S. Pat. Nos. 4,743,84; 4,778,243; 4,815,809; 4,890,896; 4,738,508 and 4,729,624.

In glass fibers the ends, after suitable treatment, may be spliced using an arc flame to weld the treated ends, see U.S. Pat. No. 4,957,343. In U.S. Pat. No. 4,790,617 the ends of two glass optical fibers are joined, within a tube, using an adhesive.

Plastic optical fibers, due to their relatively low cost, are preferable in some uses. Generally plastic optical fibers are formed of a transparent synthetic resin-based material, for example, polystyrene and resins, such as polymethylmethacrylate. Examples of such resins are given in U.S. Pat. No. 4,778,245.

In a physics study, many thousands of separate plastic optical fibers may be required to be individually connected to thousands of plastic plates or fibers having scintillator material which scintillates when bombarded with nuclear radiation, as in U.S. Pat. No. 4,788,436, incorporated by reference herein. However, such studies and the widespread use of plastic optical fibers are hindered due to the difficulty of forming splices which are low in transmission loss and which may be formed at relatively low cost. It would be expensive and time-consuming to make many thousands of splices using mechanical connectors or adhesive.

OBJECTIVES AND FEATURES OF THE INVENTION

Objectives and Features of the Invention

It is an objective of the present invention to provide an apparatus and method for the splicing of the free ends of plastic optical fibers which produces a permanent joint which has excellent optical transmission characteristics.

It is a further objective of the present invention to provide such an apparatus and method which may be used by a factory worker or in the field and which will produce an excellent splice with few failures (over 99.9% quality acceptance success rate).

It is a further objective of the present invention that the splices may be produced at a relatively high rate of speed (less than one minute per splice and preferably 2 per minute) without sacrificing the strength of the optical fibers (1 mm o.d. fibers can support a tension load of 2 kg.).

It is a still further objective of the present invention that the splices may join two different types of plastic optical fibers, for example, scintillating or wave-length-shifting optical fiber may be joined to clear optical fibers, and yet the splices will have low optical transmission loss.

SUMMARY OF THE INVENTION

In accordance with the present invention there is provided an apparatus and method for splicing the free ends of plastic optical fibers.

The apparatus comprises a base and a hood member which is hinged to the base. The hood member, when closed, forms an air-tight chamber which is connected, through valves and tubes, to respective sources of vacuum and cold air.

A high precision quartz die tube is positioned in the chamber, with the tube being split along its length to form a top split tube and a bottom split tube member. Two filaments, for example, of nicrome, tungsten or other electrical resistance material are positioned so that when the hood is closed and the two sides of the quartz split tube are brought together, the filaments form a ring which surrounds the tube.

In operation, an operator will clean the two free ends of the plastic optical fibers, to prevent lint or dirt from entering the chamber, and cut both ends with a razor blade. He then closes the hood and inserts the two cut ends into the quartz tube so the ends touch.

The two ends will align themselves, if their ends are bias-cut at a 45° angle. The operator will then activate the automatic programmed sequence which is controlled by a programmed timer. In that sequence, the hood member is evacuated to form a vacuum therein; current is passed through the filaments so they become red-hot, in about 5–30 seconds and preferably about 10–15 seconds; and the plastic at the free ends melts and blends to form a strong, durable and high transmission splice. Then cold air is blown on the splice, the hood is opened whereby the top split tube member separates from the bottom split tube member and the joined optical fiber is removed.

The outside diameter size of the splice is accurately controlled by the inside diameter of the split quartz tube.

BRIEF DESCRIPTION OF THE DRAWINGS

Other objectives and features of the present invention will be apparent from the following detailed description, taken in conjunction with the accompanying drawings.

In the drawings.

DETAILED DESCRIPTION OF THE INVENTION

As shown in FIGS. 1 through 8, the method and apparatus of the present invention is intended to provide a means to splice the free ends of plastic optical fiber.

Figure 1:
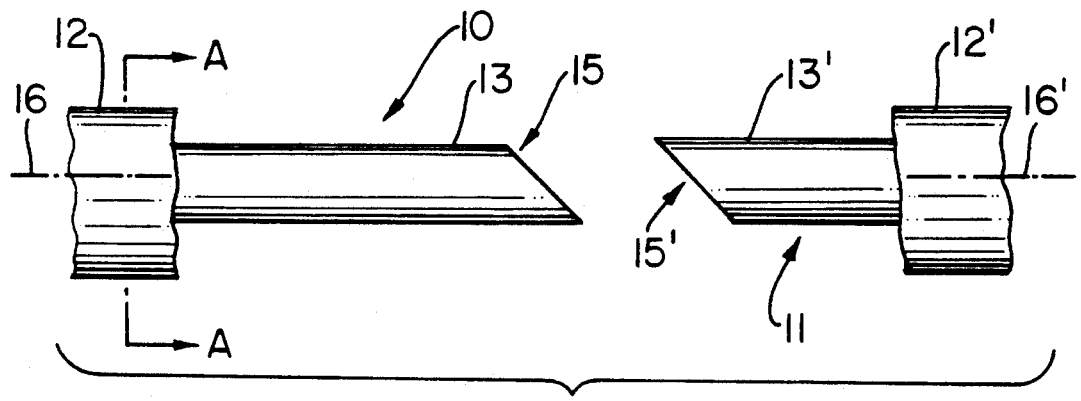
FIG. 1 is a side view, greatly enlarged, of the two free ends of plastic optical fibers after the ends have been cut to the preferred shape and before the splice is formed.
Figure 2:
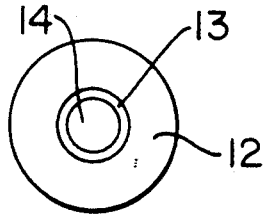
FIG. 2 is a cross-section taken along section A—A of FIG. 1.

As shown in FIG. 1, the optical fiber 10 is to be joined to the optical fiber 11, which are similarly physically constructed, i.e., the same size. The splice of the present invention may be a splice joining two optical fibers of different plastics. For example, the fiber 10 may be a transparent fiber optic of polystyrene and the fiber optic 11 may be another form of polystyrene plastic which has been doped with scintillization material to react with light emission when bombarded with nuclear radiation. Alternatively, the optical fiber 10 may be a transparent plastic material such as polystyrene and the optical fiber 11 may be a material such as acrylic resin, which is particularly adapted to transmit in the ultraviolet range.

Each of the fibers 10 and 11 consist of a thick protective plastic sheath 12,12', respectively, which surrounds the outer cladding 13,13', respectively. The cladding 13,13' surrounds the transparent core 14,14', respectively. The cladding 13,13' is of a plastic, which has a different index of refraction than the material of the core 14,14'. Generally the core 14,14' is polystyrene based and has an acrylic based cladding 13,13' or the core is acrylic based and has a cladding of fluorinated PMMA-acrylic.

The free ends 15,15' of the respective optical fibers 10,11 are preferably cut at a 45-degree angle. That angle forms a flat face which is at an angle of 45 degrees to the imaginary axis 16,16' of the optical fibers 10,11, respectively. Alternatively, although not preferred, the faces 15,15' may be flat and perpendicular to the respective axes 16,16'. It is not necessary that the end faces 15,15' be otherwise treated, i.e., polished, as the method of the present invention operates by melting the plastic of both faces 15 and 15' to form a unitary splice.

Figure 3:
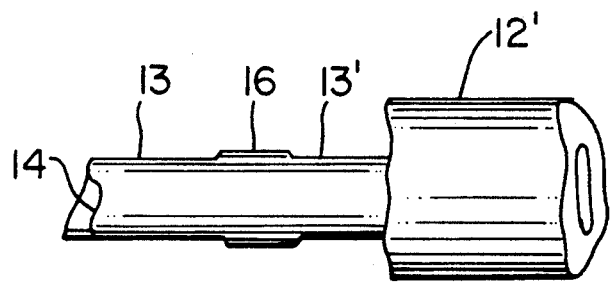
FIG. 3 is a side view of the optical fibers after the splice has been formed.
Figure 4:
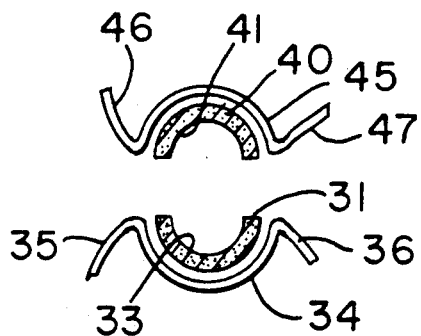
FIG. 4 is a cross-sectional view of the split quartz tube when it is in its opened position.

As shown in FIG. 3, after the optical fibers have been joined in the apparatus described in detail below. The splice forms a unified continuous structure without any discernable internal faces. The only way one can discern that a splice has been formed is that there may be a slight bulge 16 at the place of the splice; but that bulge is hardly noticeable, being generally less than 1 or 2 mils in thickness. Consequently, in the case of an optical fiber whose core and cladding have an outer diameter of 40 mils, the outer diameter may be generally no more than 42 mils at the splice.

As shown in FIG. 1, the outer protective sheath 12,12' is removed from the internal optical fibers prior to their being spliced. If desired, the splice may be covered by a protective sheath which may be applied by a tape or a coating or a tube.

As shown in FIGS. 4-7, the apparatus to form the splice of FIG. 3 includes a base 20 and a hood member 21 which is hinged on one side to the base by hinge 22. The hood 21, when closed on base 20 (down position) forms an air-tight chamber 22'. The hood 21 is moved by a piston or stepper motor drive. A line 23 (tube) leads through the base 20 to an outside source 24 of vacuum, for example, a vacuum pump or vacuum jar. A line 25 (tube) has an orifice 26 within the chamber 22 and leads through the base 20 to a source of cold air 27, which may be compressed air.

A platform 30 on the base 20 is used to position the bottom portion 31 of a split quartz tube. The bottom portion 31 forms an internal channel 33 which is approximately 180 degrees in cross-section. A filament 34, having a U-shape, is positioned close to the bottom portion 31. The filament is connected by wires 35 and 36 to a controlled current source of electricity. When the electric current is turned on, the filament 34 is heated, preferably to red-hot. A suitable filament may be constructed of an electrical resistance material such as nicrome or tungsten. Preferably the electric current is turned on for a period of about 5-30 seconds, and most preferably about 10-15 seconds.

The upper quartz tube member 40, having a 180-degree cross-sectional internal channel 41, is fixed to upper platform 42 within the hood 21. An upper filament 45 is connected by wires 46 and 47 to the electrical source 25, described above. The filament 45, like the filament 34, is U-shaped and surrounds one-half of the split tube. It receives current for the same time period as the filament 34.

Figure 7:
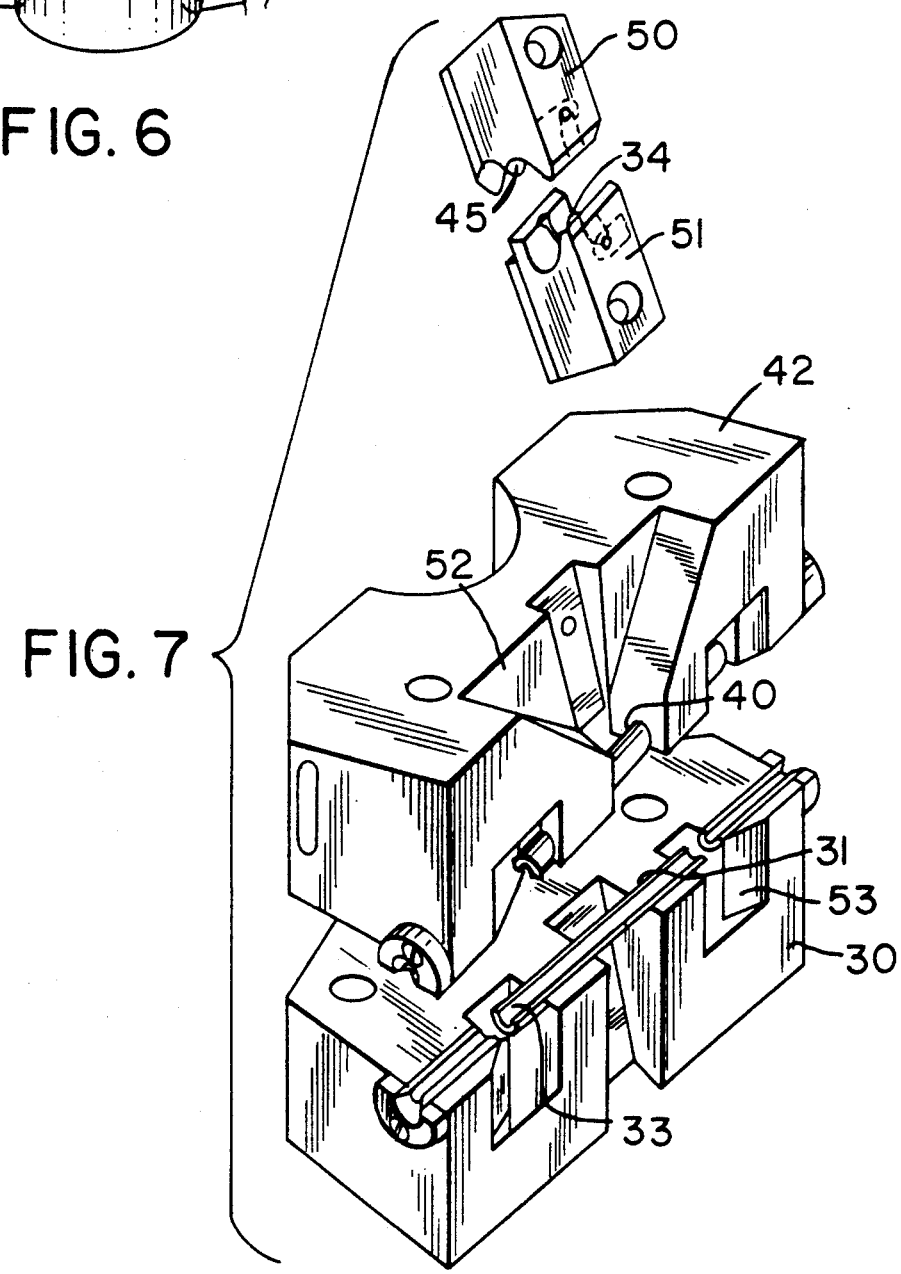
FIG. 7 is a perspective view of part of the apparatus of the present invention which forms the splice shown in FIG. 3.

As shown in FIG. 7, the filament 45 is removably mounted in block 50 and the filament 34 is removably mounted in block 51. The blocks 50 and 51 fit into the cavities 52 and 53, respectively, in platforms 42 and 30, respectively.

Figure 5:
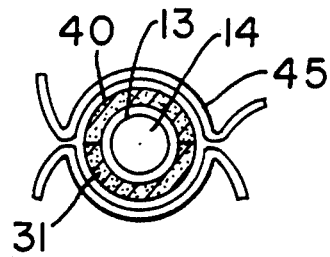
FIG. 5 is a cross-sectional view of the split quartz tube when it is in its closed position.
Figure 6:
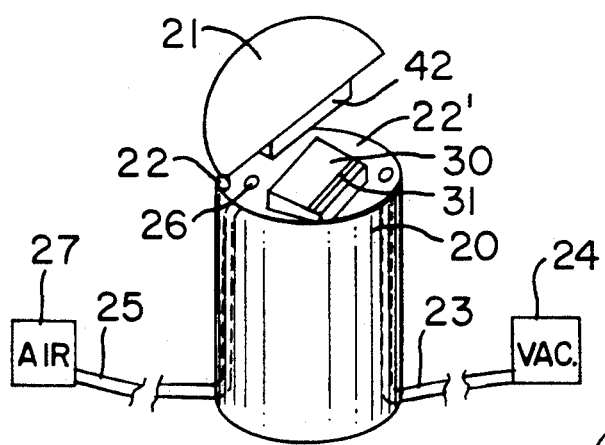
FIG. 6 is a diagram of the system of the present invention.

When the hood is 21 pivoted downwardly and closed, the upper tube member 40 comes into contact with the lower tube member 31, as shown in FIG. 5. This juncture of the lower tube member 31 and the upper tube member 40 forms an accurate chamber for the formation of the fiber optic splice and limits the expansion of the plastic material when it is heated and melted by the filaments 34 and 35. The inner diameter of the tube members 31,40 is about 2-8% larger than the outer diameter of the plastic optical fiber.

Figure 8:
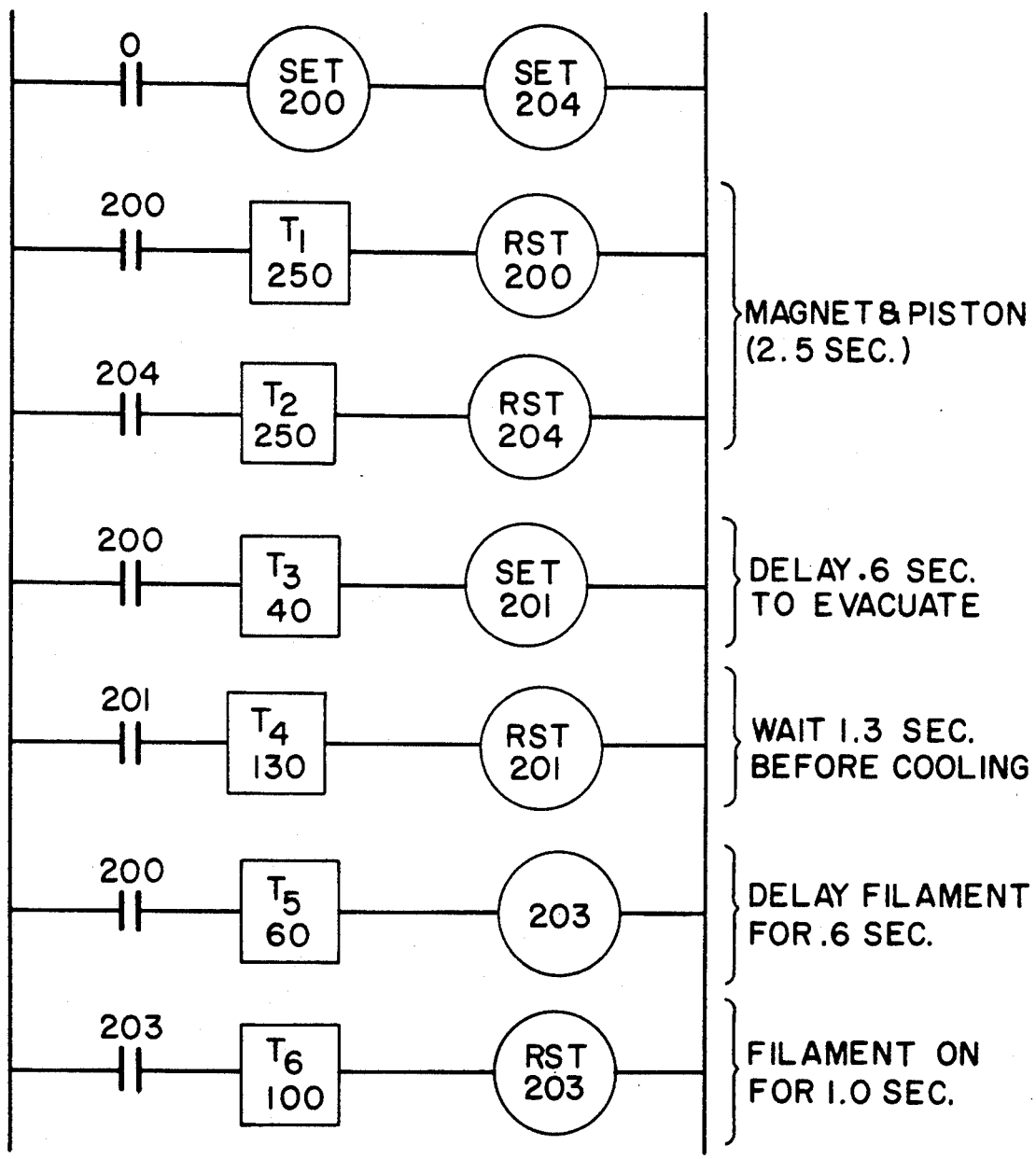
FIG. 8 is a program for the fusing used in the present invention.

FIG. 8 illustrates a preferred program which is programmed on a timer. Alternatively, a software programmed microcomputer may be used to control the steps of the procedure. The program includes operation of a control foot switch 0; operation of a piston valve 200 for a piston to close the hood 21; operation of an electromagnet 204 to lock the hood 21 on the base; operation of chamber valve 201 to evacuate the chamber 22'; and operation of filament current 203 to heat the cut ends of the two optical fibers.

I claim:

1. A method to join the two ends of plastic optical fibers to form a splice, including the steps of:
   (a) cutting an end of each optical fiber to form two flat faces;
   (b) contacting a bottom split tube member with a top split member to form a die tube;
   (c) positioning one flat face into contact with the other flat face by inserting the optical fibers into the die tube whose inner diameter tightly fits the outer diameter of the optical fibers, the die tube being within a chamber;

(d) creating a vacuum within the chamber;

(e) heating and melting the plastic at the contacted ends and while within the die tube to form a splice therebetween by heating the contacted ends for about 5–30 seconds with a resistance wire filament which surrounds the die tube;

(f) flowing a gas into the chamber to cool the splice; and (g) opening up the die tube along a plane through its axis by separating the top split tube member from the bottom split tube member and removing the spliced optical fibers therefrom.

2. A method as in claim 1 wherein the gas is air.

3. A method as in claim 1 wherein the ends are cut at a bias of about 45 degrees relative to an imaginary axis of each optical fiber.

4. A method as in claim 1 wherein the outer diameter of the die tube is about 3 to 8% larger than the inner diameter of the optical fiber and the tube is of quartz.

* * * * *

UNITED STATES PATENT AND TRADEMARK OFFICE
CERTIFICATE OF CORRECTION

PATENT NO. : 5,226,995
DATED : July 13, 1993
INVENTOR(S) : Sebastian N. White

It is certified that error appears in the above-indentified patent and that said Letters Patent is hereby corrected as shown below:

Column 1, line 4, insert the following:

--This invention was made with Government support under Contract Number DE-AC02-87ER40325 awarded by the Department of Energy. The Government has certain rights in this invention.--

Signed and Sealed this

Fifteenth Day of April, 1997

Attest:

BRUCE LEHMAN

*Attesting Officer*     *Commissioner of Patents and Trademarks*